Nov. 20, 1945.  R. Q. ARMINGTON  2,389,289
BRAKE FOR CRAWLER TRACK
Filed Feb. 18, 1944  2 Sheets-Sheet 1
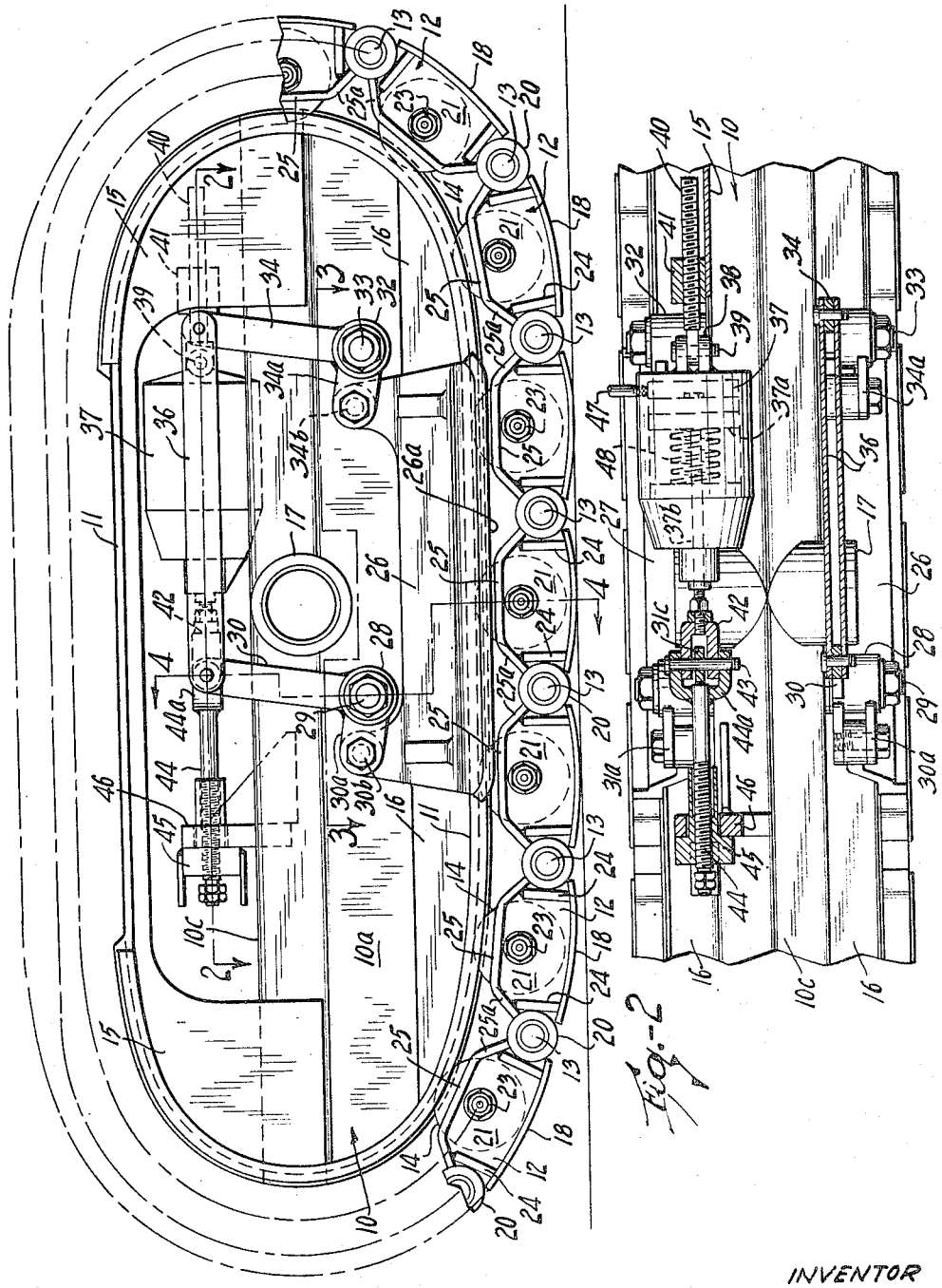
INVENTOR
RAYMOND Q. ARMINGTON
BY Hyde and Meyer
ATTORNEYS.

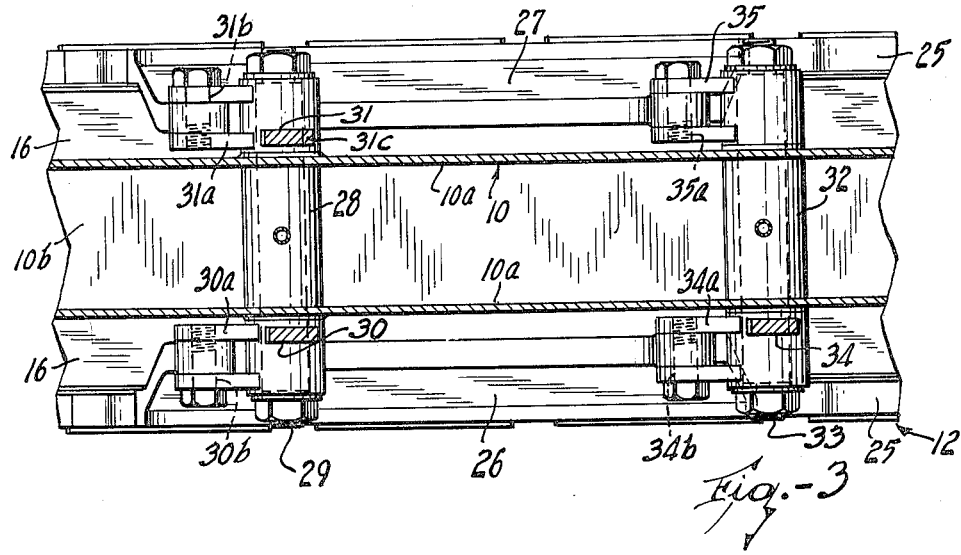
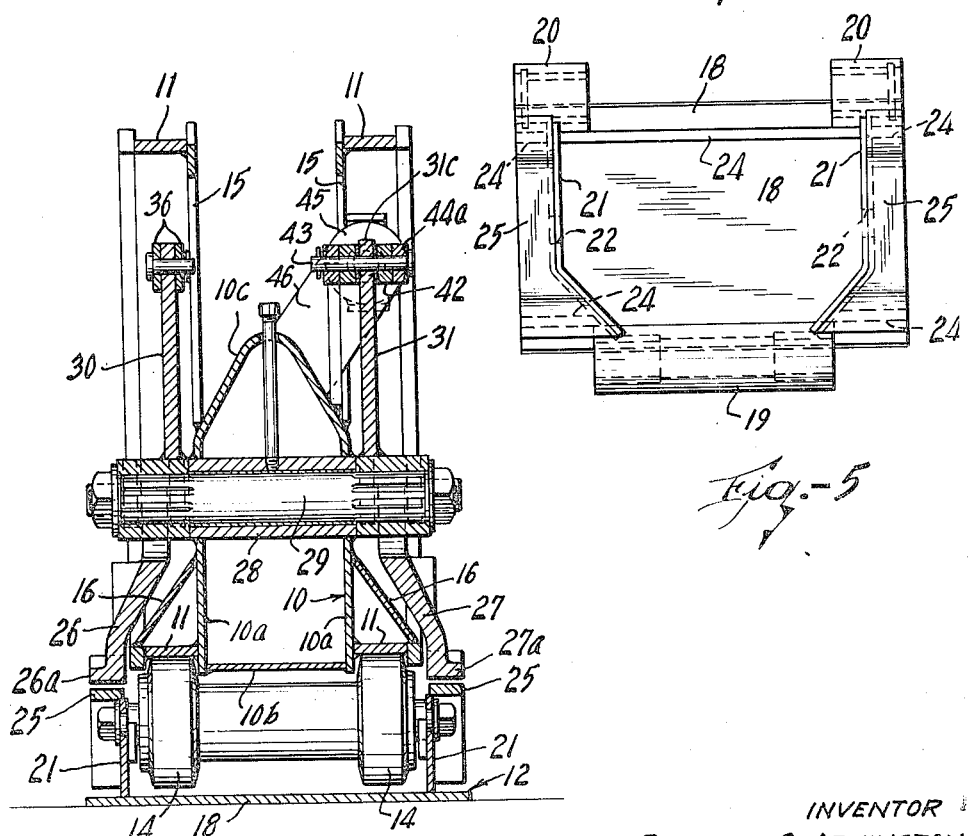

Patented Nov. 20, 1945

2,389,289

UNITED STATES PATENT OFFICE 2,389,289

BRAKE FOR CRAWLER TRACKS

Raymond Q. Armington, Shaker Heights, Ohio, assignor to The Euclid Road Machinery Co., Euclid, Ohio, a corporation of Ohio Application February 18, 1944, Serial No. 522,886

1 Claim. (Cl. 305—9)

This invention relates to improvements in brakes for endless crawler tracks.

An object of the present invention is to provide braking means for decelerating, stopping or holding an endless crawler track device. My invention contemplates the application of the brake to various types of endless tracks and the application of the brake by power means, manually or otherwise, as will appear in the following description. The essential features of my device will be summarized in the appended claim.

In the drawings:

Fig. 1 is a side elevational view of my invention applied to one type of endless crawler track;

Figs. 2, 3 and 4 are sectional views taken along similarly numbered lines of Fig. 1;

Fig. 5 is a top plan view of a single track shoe of the device of Figs. 1 to 4, with all connected parts removed.

My invention is applicable to many types of endless crawler track devices and while I have chosen to illustrate the same herein as applied to two different types of track, this should be regarded as illustrative only and in no sense as limiting the invention to those two types of track.

In the modification of Figs. 1 to 5 I have shown the brake as applied to a crawler track of the general type disclosed in the copending application of Stewart F. Armington, Serial No. 493,555, filed July 5, 1943. In this type of track a frame generally indicated at 10 supports endless guide rail means 11 of generally elliptical form about which the endless track moves. The track itself comprises a plurality of shoes 12 connected together by hinge pins 13 to provide an endless track. Each shoe supports a roller 14 and these rollers engage the guide rail 11.

Briefly, the frame 10 comprises a box beam extending longitudinally through the center of the device, this box beam having parallel side walls 10a, a bottom wall 10b and a top wall of inverted V-form 10c. The guide rail 11 is in two parallel portions spaced apart laterally as best seen in Fig. 4 and so constructed that inside and outside flanges on the guide rail serve to retain the rollers in place. Suitable supporting and stiffening plates 15 are connected with the upper run of the guide rail and supporting and dirt-shedding plates 16 are connected between the frame and the lower run of the guide rail. A sleeve 17 extends transversely through the frame at a central location so that the frame may have a trunnion mounting on the vehicle which is to be carried by the crawler track.

Each of the shoes 12 comprises a slightly curved bottom plate 18 for engaging the ground with a centrally located tubular member 19 welded at one end of the shoe and laterally spaced tubular members 20 welded at the other end, these obviously forming interfitting hinge parts which are connected together, when the track is assembled, by the hinge pins 13 which pass through suitable bores in the tubes 19 and 20, as indicated in Fig. 5. Each shoe is provided with parallel upstanding side walls 21 which are drilled at 22 to receive the shaft 23 upon which the rollers 14 are mounted. Stiffening members 24 are added where necessary. Means on the shoe for application of a brake is supplied by a pair of plates 25 extending respectively along the outer side portions of the shoe, each of these plates being bent downwardly at the ends 25a and each of the plates being welded to the parts 18, 19, 20, 21 and 24 of the shoe.

The braking means comprises a pair of brake shoes 26 and 27, preferably elongated in a fore and aft direction so as to provide sufficient braking surface 26a and 27a respectively to engage a plurality of the plates 25 of several shoes 12. Means is provided for coincidentally pressing downward on shoes 26 and 27 and, where the shoes are elongated, for pressing down coincidentally on both ends of a brake shoe. This means may be actuated manually or by power, as will presently appear.

A sleeve bearing 28 rigidly mounted crosswise in the frame 10 oscillatably supports a shaft 29 which has splined connections at its opposite ends with bell cranks 30 and 31, which have shorter arms 30a and 31a respectively which are connected with the forward ends of brake shoes 26 and 27 by pins 30b and 31b respectively. Near the rear end of the shoes a sleeve bearing 32 is rigidly mounted in frame 10 parallel to sleeve bearing 28. A shaft 33 is mounted for oscillation in this sleeve bearing and at one end has a splined connection with bell crank 34, the shorter arm of which, 34a, is connected to brake shoe 26 by pin 34b. The opposite end of shaft 33 has a splined connection with a short bifurcated lever 35 which by means of pin 35a is connected to the rear end of brake shoe 27. As best seen in Fig. 2 the upper ends of the longer arms of the bell cranks 30 and 34 are connected together by parallel links 36 so as to cause them to move in unison. Means connected with the longer arm 31c of bell crank 31 serves when operated to actuate simultaneously bell cranks 30, 31 and 34 and the short lever 35.

Power means is here shown for applying the brake shoe to the endless track. This means comprises a cylinder 37, one end of which is provided with a clevis 38 which is pivotally connected by pin 39 with a mounting rod 40 which has a threaded connection in bracket 41 rigidly mounted on frame 10. Cylinder 37 is fitted with a reciprocable piston 37a having a piston rod 37b, the free end of which is fitted with a clevis 42. This clevis is connected by pin 43 with bell crank arm 31c and with the clevis end 44a of a rod 44 whose end opposite the clevis 44a has threaded engagement with a nut 45, which in turn has a loose bearing in bracket 46 which is rigidly connected to the main frame 10. Means is provided for actuating the piston 37a which might be double acting but which in the present case is single acting by means of pressure fluid supplied at the right-hand end of cylinder 37 as viewed in Fig. 2 through conduit 47 which is connected to a source of pressure fluid, not shown. If the vehicle supported on the endless track were a trailer behind a tractor device, obviously the control of fluid flow through conduit 47 might well be placed within the control of the operator of the tractor device, if desired, such control arrangements being well known in this art. A spring 48 is supplied for returning the piston 37a toward the right as viewed in Fig. 2 when pressure fluid is exhausted though conduit 47 by suitable control means.

The purpose of nut 45 is to manually apply the brake shoes if so desired and in the absence of power for the cylinder 37. For instance, if the endless track device shown were attached to a non-driving vehicle, as a trailer or the like, then if this non-driving vehicle were disconnected from its tractor device it might be desirable to set the brakes. In this case the nut 45 would be turned on the rod 44 so as to move the bell cranks 33 and 34 in a counterclockwise direction as viewed in Fig. 1, which of course corresponds to similar movement of bell crank 31 and lever arm 35. Obviously the nut 45 may be turned sufficiently to press the brake shoes 26 and 27 against the plates 25 of several shoes of the endless track which are in engagement with the ground or other supporting surface. In a similar manner, when the parts are in the position of Figs. 1 and 2 with the application of pressure fluid through conduit 47, the brakes may be similarly applied and upon release of the pressure fluid spring 48 will cause return movement of piston 37a so as to release the brakes. The upwardly inclined ends of brake shoes 26 and 27 coact with the inclined ends of the plates 25 to provide easy engagement between the brake shoes and the track shoes when the latter are moving.

In my device I have shown a brake shoe connected with the frame of the crawler track device and adapted to be moved downwardly in frictional engagement with a portion of the endless track which is in engagement with the ground. Thus that portion of the endless track may be held frictionally between the brake shoe and the ground so as to stop movement of the crawler track. It is obvious that this principle is equally applicable to a bogie-wheel type track or to an endless flexible track or any other type of endless track where a portion thereof may be gripped between the ground and a brake shoe carried by the frame.

What I claim is:

In combination, a frame having guide rail means substantially parallel to the ground, an endless crawler track on said frame having a lower run extending between said rail means and the ground, said track comprising a plurality of shoes hinged together, each of said shoes having a roller engaging said rail means, a pair of substantially parallel brake shoes carried by said frame above said lower run of said track, said brake shoes being adapted to engage the shoes of said track on opposite sides thereof, lever means for moving each of said brake shoes downwardly, and power means operatively connected with said lever means for actuating both of said brake shoes coincidentally in track-engaging direction.

RAYMOND Q. ARMINGTON.